United States Patent [19]
Alferness et al.

[11] Patent Number: 5,555,396
[45] Date of Patent: Sep. 10, 1996

[54] HIERARCHICAL QUEUING IN A SYSTEM ARCHITECTURE FOR IMPROVED MESSAGE PASSING AND PROCESS SYNCHRONIZATION

[75] Inventors: Merwin H. Alferness, New Brighton; Charles R. Caldarale, Minneapolis; David R. Johnson, Oakdale; Joseph P. Kerzman, New Brighton; James R. McBreen, Shoreview, all of Minn.

[73] Assignee: Unisys Corporation, Blue Bell, Pa.

[21] Appl. No.: 362,034

[22] Filed: Dec. 22, 1994

[51] Int. Cl.⁶ .......................... G06F 12/00; G06F 12/08
[52] U.S. Cl. .................. 395/474; 395/480; 395/492; 395/874; 395/876
[58] Field of Search .................... 395/872, 874, 395/876, 200.14, 474, 480, 492, 200.17, 200.18; 364/514 C

[56] References Cited

U.S. PATENT DOCUMENTS

| | | | |
|---|---|---|---|
| 4,394,725 | 7/1983 | Bienvenu et al. | 364/200 |
| 4,649,473 | 3/1987 | Hammer et al. | 364/200 |
| 4,694,396 | 9/1987 | Weisshaar et al. | 364/300 |
| 4,807,111 | 2/1989 | Cohen et al. | 364/200 |
| 4,937,737 | 6/1990 | Schwane et al. | 364/200 |
| 5,036,459 | 7/1991 | den Haan | 364/200 |
| 5,073,852 | 12/1991 | Siegel et al. | 395/700 |
| 5,133,053 | 7/1992 | Johnson | 395/200 |
| 5,218,713 | 6/1993 | Hammer et al. | 395/800 |
| 5,222,217 | 6/1993 | Blount et al. | 395/325 |
| 5,224,215 | 6/1993 | Disbrow | 395/250 |
| 5,230,051 | 7/1993 | Quan | 395/700 |
| 5,313,638 | 5/1994 | Ogle et al. | 395/725 |
| 5,319,778 | 6/1994 | Catino | 395/600 |

OTHER PUBLICATIONS

The Design of the UNIX Operating System, Maurice Bach, 1986, ISBN # 0-13-201799-7 025.

Gregory T. Byrd and Bruce A. Delagi, "Support for Fine-Grained Message Passing in Shared Memory Multiprocessors" Mar. 1989, Knowledge Systems Laboratory, Report No. KSL-89-15, pp. 1-20.

F. J. Burkowski, G. V. Cormack, G. D. P. Dueck, "Architectural Support for Synchronous Task Communication" SIGARCH Computer Architecture News, vol. 17, No. 2, Apr. 1989, pp. 40-53.

Brian N. Bershad, Thomase E. Anderson, "User-Level Interprocess Communication for Shared Memory Multiprocessors" ACM Transactions on Computer Systems, vol. 9, No. 2, May 1991, pp. 175-198.

Joseph Pasquale, Eric Anderson, P. Keith Muller, "Container Shipping Operating System Support for I/O Intensive Applications" IEEE Computer Mar. 1994, pp. 84-93.

Gary J. Nutt, "Centralized and Distributed Operating Systems" Prentice-Hall, Inc., 1992, pp. 31-37, 109-117.

*Primary Examiner*—Tod R. Swann
*Assistant Examiner*—Christopher Chow
*Attorney, Agent, or Firm*—Charles A. Johnson; Mark T. Starr

[57] ABSTRACT

A system and method for interprocess communication between concurrently executing, cooperating sequential processes in a digital computer system uses a shared memory queue as a mechanism for message passing and process synchronization. Data to be transferred from a sending process to a receiving process is stored in a queue entry on the shared memory queue. Hierarchical queuing allows a sending process to collect multiple message segments as entries in a local sub-queue, which is enqueued as a single entity to the shared memory queue when all message segments are present. The receiving process dequeues the sub-queue in one operation, thereby increasing the efficiency of message transfer while preventing the erroneous dequeuing of message segments when multiple receiving processes are waiting on the same shared memory queue. In this manner, the logical maximum size of a message being passed between processes is expanded.

4 Claims, 3 Drawing Sheets

HIERARCHICAL QUEUING IN A SYSTEM ARCHITECTURE FOR IMPROVED MESSAGE PASSING AND PROCESS SYNCHRONIZATION

RELATED APPLICATIONS

This application relates to the concurrently filed application of Merwin H. Alferness, et. al. Ser. No. 08/362,632, entitled "System Architecture for Improved Message Passing and Process Synchronization Between Concurrently Executing Processes," the disclosure of which is hereby incorporated by reference.

BACKGROUND OF THE INVENTION

1. Field of the Invention

This invention relates generally to multiprocessing digital computer systems and particularly to methods and systems for passing large messages between concurrently executing processes and for synchronizing concurrently executing processes.

2. Background Information

The application of Merwin H. Alferness, et. al., Ser. No. 08/362,632, discloses a system architecture for providing improved message passing and process synchronization capabilities. Critical enhancements are made to operating system functions to permit processes executing within this system architecture to pass large messages between them without incurring large performance penalties associated with multiple copy operations on the message data. High level language support is provided in this system to enable an applications programmer to easily use the added functionality of the system. Hardware instruction level support is also provided by the system to ensure that transfers of data and synchronization of communicating processes take place at machine speeds, rather than through multiple software layers of process control in the operating system.

The system architecture, known as the "Queuing Architecture," uses queues as a mechanism for message passing and process synchronization. A queue client process places entries or events on a queue. A queue server process receives entries or events from a queue. An entry contains a message passed between a client and a server over the queue. The message consists of data or control information. An event is an indication that a condition known to both the client and server has occurred, but which contains no message. Thus, an event works as a synchronization mechanism between processes. Each element on a queue is represented in a unit of storage called a queue bank. The queue bank has a control area and a text area. The control area contains control information and pointers to other entries on a queue. The text area contains the message data. In the preferred embodiment of the present invention, the text area of a queue bank consists of 262,144 36-bit words. A queue bank may be a queue header or a queue entry. A queue is made up of one queue header and zero or more queue entries. The queue header holds control information for the queue. Queue entries hold the message data being passed between processes. To pass a message from one process to another process in the Queuing Architecture, the sending process inserts the message data into a queue entry and then enqueues it to a queue. The receiving process, which may be waiting on entries being placed on the queue, dequeues the queue entry anti processes the message data.

There are several limitations with this system architecture and how it uses queues to pass messages. The size of a message to be passed between two processes may be greater than the maximum size of a single queue bank. An approach to solving this problem would be to have the sending process split the message into multiple message segments, with each message segment being stored in a different queue entry. The receiving process would then have to know which queue entries on the queue were related to each other and how to reassemble the message from its parts. To accomplish this, control information would have to be passed in the message data (in the text area) for each message segment. The drawback to this approach is that extra software complexity is required in each process for segmenting the message data, inserting the control information into the message data, and reassembling the message. It would be more desirable for programmers writing software for application processes to not have to be burdened with this requirement. The additional segmentation and reassembling processing would also have a negative performance impact because of the extra instructions executed by the system to perform these functions.

In situations where multiple processes are dequeuing entries from the head of a single queue, this type of message segmentation would be unworkable. All message segments of a single message would need to be dequeued by the same receiving process and reassembled to form the message again for further processing. Thus, each receiving process would have to inspect the queue entries to determine if the message data in a particular queue entry is part of a series of message segments that the receiving process is currently handling. This extra processing is cumbersome and would also have a negative impact on system performance.

SUMMARY OF THE INVENTION

An object of this invention is to provide an efficient mechanism in a queuing system architecture for collecting multiple segments of a message to be sent from a sending process to a receiving process on a queue until all message segments have arrived, and then passing the message segments to the receiving process as a single entity.

Another object of this invention is to provide a means for ensuring that all associated queue entries holding multiple segments of a message are dequeued by the same receiving process in a queuing system architecture where multiple receiving processes are active for the same queue.

A further object of this invention is to logically expand the size of a queue entry in a queuing system architecture beyond what can be supported by a single queue bank.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended Claims.

According to the present invention, the foregoing and other objects and advantages are attained by a system architecture for improved message passing and process synchronization whereby hierarchical queuing of messages expands the logical size of messages passed between processes, simplifies the communication of messages broken up into multiple segments, and ensures that receiving processes accept the correct message segments for further processing with a minimal amount of overhead.

In accordance with an aspect of this invention, an improvement to a system having a plurality of processes controlled by a computer operating system being executed by at least one instruction processor coupled to a main storage unit is provided. The system includes local queue creation means for creating a local queue in the main storage unit. The local queue has a queue header and the capability to hold at least one queue entry. A group of data signals to be transferred from a sending process to a receiving process is stored in a queue entry. Enqueue means is provided for adding the queue header of the local queue as a queue entry to a primary communications queue between the processes in response to an enqueue request from the sending process. Dequeue means is provided to remove the queue header of the local queue from the primary queue in response to a dequeue request from the receiving process. The data signals stored in the dequeued local queue are then accessible by the receiving process.

In accordance with another aspect of the invention, a method of interprocess communication comprises the steps of creating a primary queue having a queue header and zero or more queue entries, each queue entry being used to store a message to be transferred from a first process to a second process, and creating a local queue having a queue header and at least one queue entry. One of a plurality of message segments of a single large message is stored in each queue entry on the local queue. After all queue entries containing message segments are enqueued to the local queue, the local queue is added as a single entity to the primary queue by the first process. This is done by enqueueing the local queue's queue header as a queue entry on the primary queue. The local queue is subsequently removed from the primary queue as a single entity by the second process. The second process now has access to the entire message via the message segments.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended Claims.

DESCRIPTION OF THE PREFERRED EMBODIMENT

Figure 1:
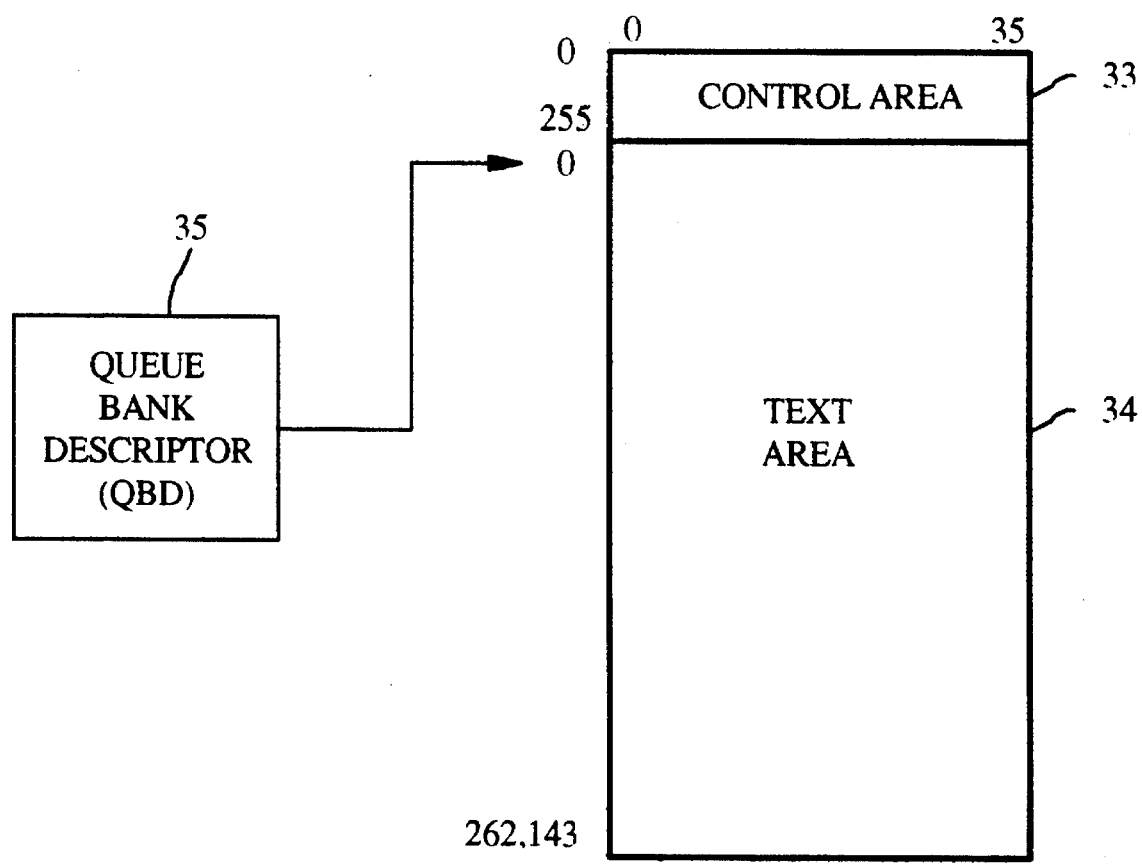
FIG. 1 is a diagram of the format of a Queue Bank.

A Queue is the conceptual model used by the present invention to attain improved message passing and faster process synchronization between processes. A Queue in the preferred embodiment consists of one Queue Header and zero or more Queue Entries. The object making up each element in the Queue is called a Queue Bank. A Queue Bank is a unit of storage in the system. Queue Banks are units of storage used as either Queue Headers, Queue Entries, or both. A Queue Bank is comprised of two parts, a Control Area for control information, and a Text Area for message data. A Queue Bank is referenced and described by a Queue Bank Descriptor (QBD). FIG. 1 is a diagram of the format of a Queue Bank. In the preferred embodiment, the Queue Bank contains a protected 256-word Control Area 33, which contains the queue links and various queue controls, and a 1- to 262,144-word Text Area 34, used to hold data specific to the queuing protocol used. The number of words in the Text Area used is dependent on the size of the data being passed in the message. This size is specified by an Upper Limit field. A Queue Bank Descriptor (QBD) 35 is used to describe a Queue Bank. A Bank Descriptor is the basic storage structure used for managing the addressing environment. Bank Descriptors are referenced by the Bank Descriptor Index (BDI) field of a virtual address (VA). In the preferred embodiment, the VA is a 36-bit word identifying the name of the bank in which the address lies and the position of the address within the bank. The bank name identifies the Bunk Descriptor that describes the bank. Complete details of the structure of Queue Bank and Queue Bunk Descriptors are found on pp.38–42 of the related application Ser. No. 08/362,632.

Figure 2:
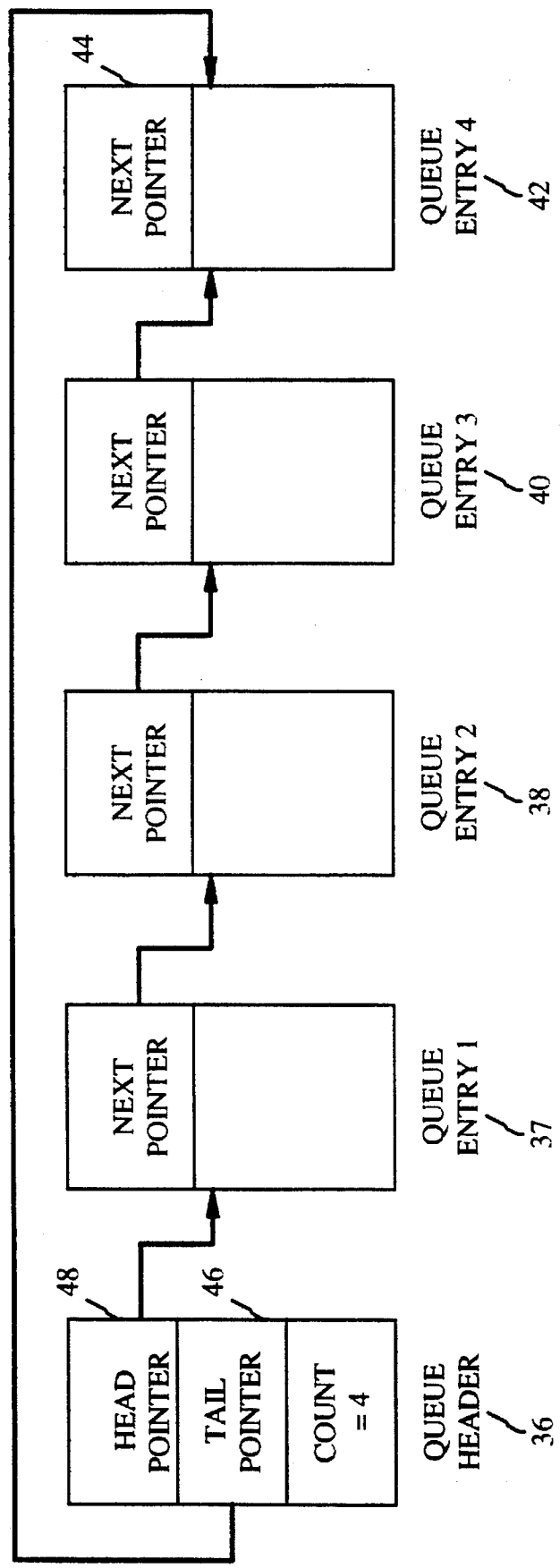
FIG. 2 is a diagram illustrating a sample Queue.

For each queue, one Queue Bank acts as the Queue Header. In the Queue Header, a Head Pointer and a Tail Pointer address the head and tail Queue Entries, respectively. A Count is included in the Queue Header to store the number of Queue Entries currently enqueued. In each Queue Entry, a Next Pointer points to the next Queue Entry in the Queue. FIG. 2 is a diagram illustrating a sample Queue. The Queue Header 36 describes a Queue with four Queue Entries labeled 37, 38, 40, and 42, respectively. Execution of an enqueue instruction to this Queue Header 36 will add a Queue Entry to the tail of the Queue (unless a forced enqueue to the head of the queue is indicated in the Queue Header). The new Queue Entry 5 (not shown) will be pointed to by the Next Pointer 44 of Queue Entry 4 42, and by the Tail Pointer 46 of the Queue Header 36. Execution of a dequeue instruction based on this Queue Header 36 will retrieve Queue Entry 1 37, redirecting the Queue Header's Head Pointer 48 to point to Queue Entry 38. Execution of another dequeue instruction will retrieve Queue Entry 2 38, and so on.

Figure 3:
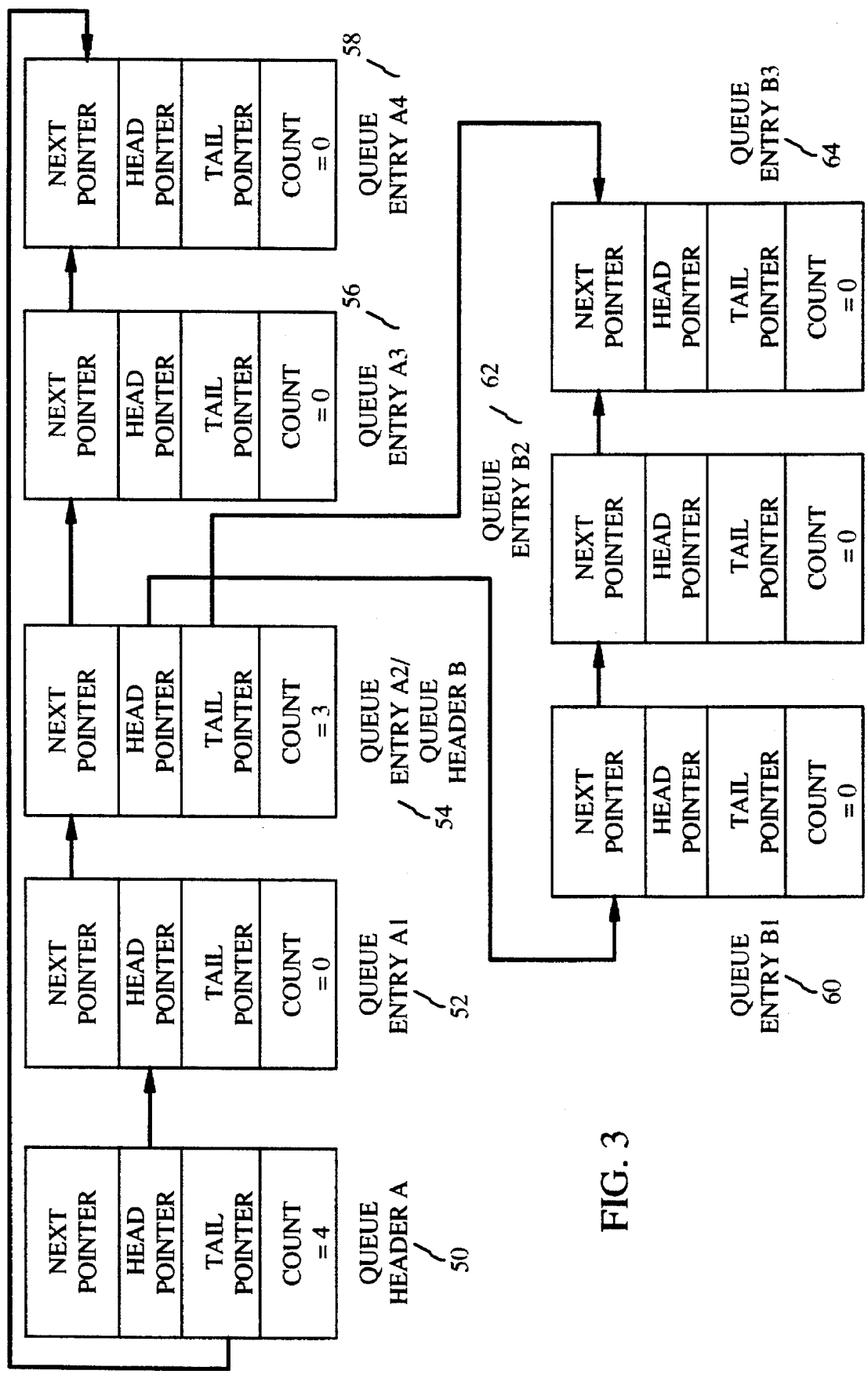
FIG. 3 is a diagram illustrating the concept of hierarchical Queuing.

To accommodate messages larger than can be placed in a single Queue Entry and certain order-critical protocols, the Queuing Architecture supports hierarchical queuing. With hierarchical queuing, one queue can be enqueued and dequeued as a single entity on another queue. Thus, a queue entry can concurrently be a header of a queue and an entry on another queue. To support hierarchical queuing, all fields relevant to both Queue Headers and Queue Entries are included in all Queue Banks. FIG. 3 is a diagram illustrating the concept of hierarchical queuing. In the example shown in FIG. 3, there are two Queues. Queue A, defined by Queue Header A 50, may be thought of as a primary queue. It has four enqueued Queue Entries, A1 through A4, labeled 52, 54, 56, and 58, respectively. Queue B, defined by Queue Header B 54, is a local queue. It has three enqueued Queue Entries, B1 through B3, labeled 60, 62, and 64, respectively. Queue Header B 54 is also Queue Entry A2 54 on Queue A. Queue B is enqueued to Queue A by executing an enqueue instruction with a Queue Entry of Queue Header B and a Queue Header of Queue Header A.

One skilled in the art can see that by using hierarchical queuing, a sending process can collect message segments by storing each segment into a queue entry and placing it in a local queue called a "sub-queue" (Queue B in FIG. 3). When all segments of the message are received by the sending process from whatever device or process is sending the data to the sending process, the "sub-queue" as a whole may be enqueued to the queue. When multiple receiving processes are servicing the queue, reception of all associated message segments at the same time is assured because the receiving process dequeues the sub-queue in one instruction. The Dequeue (DEQ) or Dequeue Or Wait (DEQW) instructions (as disclosed in related application Ser. No. 08/362,632 are used to perform this dequeuing operation. The receiving process knows how many queue entries are on the sub-queue by a field in the control area of the sub-queue's queue header. The use of hierarchical queuing also expands the logical size of a queue entry because it allows a single entry to actually consist of a nested queue. Hence, the maximum size of a message is bounded only by the memory space of the system that is available for message processing.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended Claims.

We claim:

1. In a system having a plurality of processes controlled by a computer operating system, the system including at least one instruction processor coupled to a main storage unit, units of data storage residing in the main storage unit called queue banks, each queue bank being capable of representing a queue header element or a queue entry element of a queue, each queue including one queue header and zero or more queue entries, a queue being the mechanism by which processes can communicate with each other and containing attributes describing its use, a queue entry being used for storing message data, the computer operating system having a function for creating a primary queue in response to a request from a first process, a system for providing inter-process communication without copying message data or requiring computer operating system action comprising:

(a) local queue creation means for creating a local queue in the main storage unit, said local queue being accessible only to the first process creating said local queue, said local queue having a queue header and at least one queue entry, and for storing a plurality of multi-word messages to be transferred from the first process to a second process into said at least one queue entry;

(b) enqueue means for adding said queue header of said local queue as a queue entry to a primary queue without performing a data copy of said plurality of multi-word messages and without requiring actions to be taken by the computer operating system, in response to an enqueue request from the first process; and (c) dequeue means for removing said queue header of said local queue from said primary queue in response m a dequeue request from said second process, whereby access is provided to said plurality of multi-word messages stored in said at least one queue entry of said local queue to said second process, without performing a data copy of said plurality of multi-word messages and without requiring actions to be taken by the computer operating system, and wherein said second process gains concurrent access to said plurality of multi-word messages.

2. In a system having at least first and second processes being controlled by a computer operating system, the system including at least one instruction processor coupled to a main storage unit, units of data storage residing in the main storage unit called queue banks, each queue bank being capable of representing a queue header element or a queue entry element of a queue, each queue including one queue header and zero or more queue entries, a queue being the mechanism by which processes can communicate with each other and containing attributes describing its use, a queue entry being used for storing message data, a method of interprocess communication without copying message data or requiring computer operating system action comprising the steps of:

(a) creating a primary queue in the main storage unit, said primary queue having a queue header and zero or more queue entries, wherein each of said queue entries stores message data to be transferred from the first process to the second process;

(b) creating a local queue in the main storage unit, said local queue having a queue header and at least one queue entry;

(c) storing a plurality of multi-word messages to be transferred from the first process to the second process in said at least one queue entry of said local queue;

(d) adding said local queue to said primary queue by enqueuing said queue header of said local queue as a queue entry in said primary queue without performing a data copy of said plurality of multi-word messages and without requiring actions to be taken by the computer operating system; and (e) removing said local queue from said primary queue by dequeuing said queue header of said local queue, thereby providing access to said plurality of multi-word messages stored in said at least one queue entry of said local queue for the second process, without performing a data copy of said plurality of multi-word messages and without requiring actions to be taken by the computer operating system.

3. In a computer system having a queuing architecture to support interprocess communication between at least first and second processes being executed by at least one processor coupled to a main storage unit and controlled by a computer operating system, units of data storage residing in the main storage unit called queue banks, each queue bank being capable of representing a queue header element or a queue entry element of a queue, each queue including one queue header and zero or more queue entries, a queue being the mechanism by which princesses can communicate with each other and containing attributes describing its use, a queue entry being used for storing a multi-word message segment, a method of interprocess communication without copying message segments comprising the steps of:

(a) creating a primary queue in the main storage unit;

(b) creating a local queue in the main storage unit;

(c) storing a multi-word message segment into a queue bank;

(d) adding said queue bank as a queue entry to said local queue by enqueuing said queue bank to said local queue without performing a data copy of said multi-word message segment and without requiring actions to be taken by the computer operating system;

(e) repeating steps (c) and (d) for all said message segments to be sent from the first process to the second process that must be processed by the second process together as a complete message;

(f) adding said local queue to said primary queue by enqueuing said queue header of said local queue as a queue entry in said primary queue without performing a data copy of said multi-word message segment and without requiring actions to be taken by the computer operating system, and;

(g) removing said local queue from said primary queue by dequeuing said queue header of said local queue without performing a data copy of said multi-word message segment and without requiring actions to be taken by the computer operating system, thereby providing access to said complete message for the second process.

4. A method as in claim 3, wherein said adding local queue to said primary queue step adds said local queue to the front of said primary queue.

* * * * *